(12) United States Patent
Shieh et al.

(10) Patent No.: US 12,395,490 B2
(45) Date of Patent: Aug. 19, 2025

(54) SYSTEM AND METHOD FOR MANAGING USER ACCESS TO CLOUD-BASED APPLICATIONS IN AN ENTERPRISE ENVIRONMENT

(71) Applicant: Appaegis Inc., Palo Alto, CA (US)

(72) Inventors: Choung-Yaw Michael Shieh, Palo Alto, CA (US); Yonghui Cheng, Los Altos, CA (US)

(73) Assignee: Appaegis Inc., Palo Alto, CA (US)

( * ) Notice: Subject to any disclaimer, the term of this patent is extended or adjusted under 35 U.S.C. 154(b) by 245 days.

(21) Appl. No.: 18/322,625

(22) Filed: May 24, 2023

(65) Prior Publication Data

US 2024/0236102 A1 Jul. 11, 2024

Related U.S. Application Data

(60) Provisional application No. 63/478,645, filed on Jan. 5, 2023.

(51) Int. Cl.
*H04L 9/40* (2022.01)

(52) U.S. Cl.
CPC .......... *H04L 63/102* (2013.01); *H04L 63/083* (2013.01)

(58) Field of Classification Search
CPC . H04L 63/102; H04L 63/083; H04L 63/0815; G06F 21/31
See application file for complete search history.

(56) References Cited

U.S. PATENT DOCUMENTS

| | | | | |
|---|---|---|---|---|
| 10,313,386 | B1 * | 6/2019 | Roturier | H04L 63/107 |
| 11,184,312 | B1 * | 11/2021 | Yoskowitz | H04L 51/48 |
| 2001/0044785 | A1 * | 11/2001 | Stolfo | G06F 21/6254 |
| | | | | 705/74 |
| 2009/0300127 | A1 * | 12/2009 | Du | H04L 51/214 |
| | | | | 709/206 |
| 2010/0088753 | A1 * | 4/2010 | Ayres | G06F 21/41 |
| | | | | 709/206 |
| 2016/0197900 | A1 * | 7/2016 | Forster | H04L 63/029 |
| | | | | 713/168 |
| 2016/0255040 | A1 * | 9/2016 | Howe | H04L 51/212 |
| | | | | 709/206 |
| 2019/0180053 | A1 * | 6/2019 | Angara | G06F 21/6254 |
| 2020/0120079 | A1 * | 4/2020 | Callaghan | H04L 63/08 |
| 2021/0049021 | A1 * | 2/2021 | De Jong | G06F 21/32 |
| 2021/0258303 | A1 * | 8/2021 | Branch | G06F 11/3668 |
| 2023/0291766 | A1 * | 9/2023 | Turgeman | H04L 63/1491 |

OTHER PUBLICATIONS

Burr et al., NIST Special Publication (SP) 800-63-2, 'Electronic Authentication Guideline' (Year: 2013).*

* cited by examiner

*Primary Examiner* — Tod R Swann
*Assistant Examiner* — Amir Mahdi Hajiabbasi
(74) *Attorney, Agent, or Firm* — Jason C. Cameron

(57) ABSTRACT

A system and method for managing a user access to cloud-based applications in an enterprise environment is disclosed. The system generates a surrogate email account for a user profile linked to one or more cloud-based applications. This surrogate email account is separate from the user's workspace email account and its associated credentials are stored in a database. When a user accesses a cloud-based application through a webpage URL, the system detects the access and retrieves the surrogate email account credentials from the database. Using these credentials, the system dynamically authenticates the user profile and grants the user access to the cloud-based applications.

15 Claims, 5 Drawing Sheets

SYSTEM AND METHOD FOR MANAGING USER ACCESS TO CLOUD-BASED APPLICATIONS IN AN ENTERPRISE ENVIRONMENT

CROSS REFERENCE TO RELATED APPLICATIONS

This application claims the priority to incorporates by reference the entire disclosure of U.S. provisional patent application No. 63/478,645, filed on Jan. 5, 2023.

TECHNICAL FIELD

Embodiments of the present disclosure relate to cybersecurity systems and more particularly relate to a system and a method for managing a user access to cloud-based applications in an enterprise environment to effectively manage identity and access using surrogate email accounts.

BACKGROUND

Generally, enterprises operate with a multitude of Software as a Service (Saas) applications. While some of these applications support Single Sign-On (SSO) through integration with identity providers, and many SaaS applications used by enterprises do not support SSO due to various reasons such as lack of support for the required protocol or licensing limitations imposed by the SaaS application vendors. As a result, most of the enterprises have SaaS applications without SSO than those with SSO, thereby leading to blind spots and management headaches for the security team. To effectively manage the identity and access of these SaaS applications that do not support SSO, it is crucial for the enterprise security team to manage the lifecycle of the user accounts, including account creation, credential updates, and account deletion. The security team may also need an option to control the identity and hide the credential from end-users to prevent them from accessing SaaS applications directly from unauthorized devices.

Currently, centralizing access control of SaaS applications is critical to protect enterprise data and reduce human errors. However, many SaaS applications do not support standard SSO protocols, which makes it difficult to manage access control and the lifecycle of accounts in those SaaS applications. For those SaaS applications not supporting SSO protocols, users can access SaaS applications from any computer with weak or shared passwords, leading to unauthorized access and many enterprise data breaches. Further, account management actions such as account creation and credential update require email for communication. However, monitoring users' workspace email accounts can be resource-intensive and invade users' privacy.

Hence, there is a need in the art for a system and a method for managing a user access to cloud-based applications in an enterprise environment to effectively identity and access management using surrogate email accounts for addressing at least the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented system for managing a user access to cloud-based applications in an enterprise environment. The system creates a surrogate email account corresponding to a user profile associated with one or more cloud-based applications in an enterprise environment. The surrogate email account is distinct from a workspace email account associated with the user profile. Further, the system stores, in a database, one or more credentials associated with the created surrogate email account. Furthermore, the system detects a user access to the one or more cloud-based applications, through a webpage universal resource locator (URL). Additionally, the system retrieves, from the database, the one or more credentials associated with the surrogate email account, in response to the detected user access. Further, the system dynamically authenticates the user profile to authorize the user access to the one or more cloud-based applications, based on the retrieved one or more credentials associated with the surrogate email account.

Another aspect of the present disclosure provides a computer-implemented method for managing a user access to cloud-based applications in an enterprise environment. The method includes creating a surrogate email account corresponding to a user profile associated with one or more cloud-based applications in an enterprise environment. The surrogate email account is distinct from a workspace email account associated with the user profile. Further, the method includes storing, in a database, one or more credentials associated with the created surrogate email account. Furthermore, the method includes detecting a user access to the one or more cloud-based applications, through a webpage universal resource locator (URL). Further, the method includes retrieving, from the database, the one or more credentials associated with the surrogate email account, in response to the detected user access. Additionally, the method includes authenticating dynamically the user profile to authorize the user access to the one or more cloud-based applications, based on the retrieved one or more credentials associated with the surrogate email account.

Yet another aspect of the present disclosure provides a non-transitory computer-readable storage medium having programmable instructions stored therein. When the programmable instructions executed by one or more hardware processors, cause the one or more hardware processors to create a surrogate email account corresponding to a user profile associated with one or more cloud-based applications in an enterprise environment. The surrogate email account is distinct from a workspace email account associated with the user profile. Further, the one or more hardware processors store, in a database, one or more credentials associated with the created surrogate email account. Further, the one or more hardware processors detect a user access to the one or more cloud-based applications, through a webpage universal resource locator (URL). Furthermore, the one or more hardware processors retrieve, from the database, the one or more credentials associated with the surrogate email account, in response to the detected user access. Additionally, the one or more hardware processors authenticate dynamically, the user profile to authorize the user access to the one or more cloud-based applications, based on the retrieved one or more credentials associated with the surrogate email account.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which.

Figure 1:
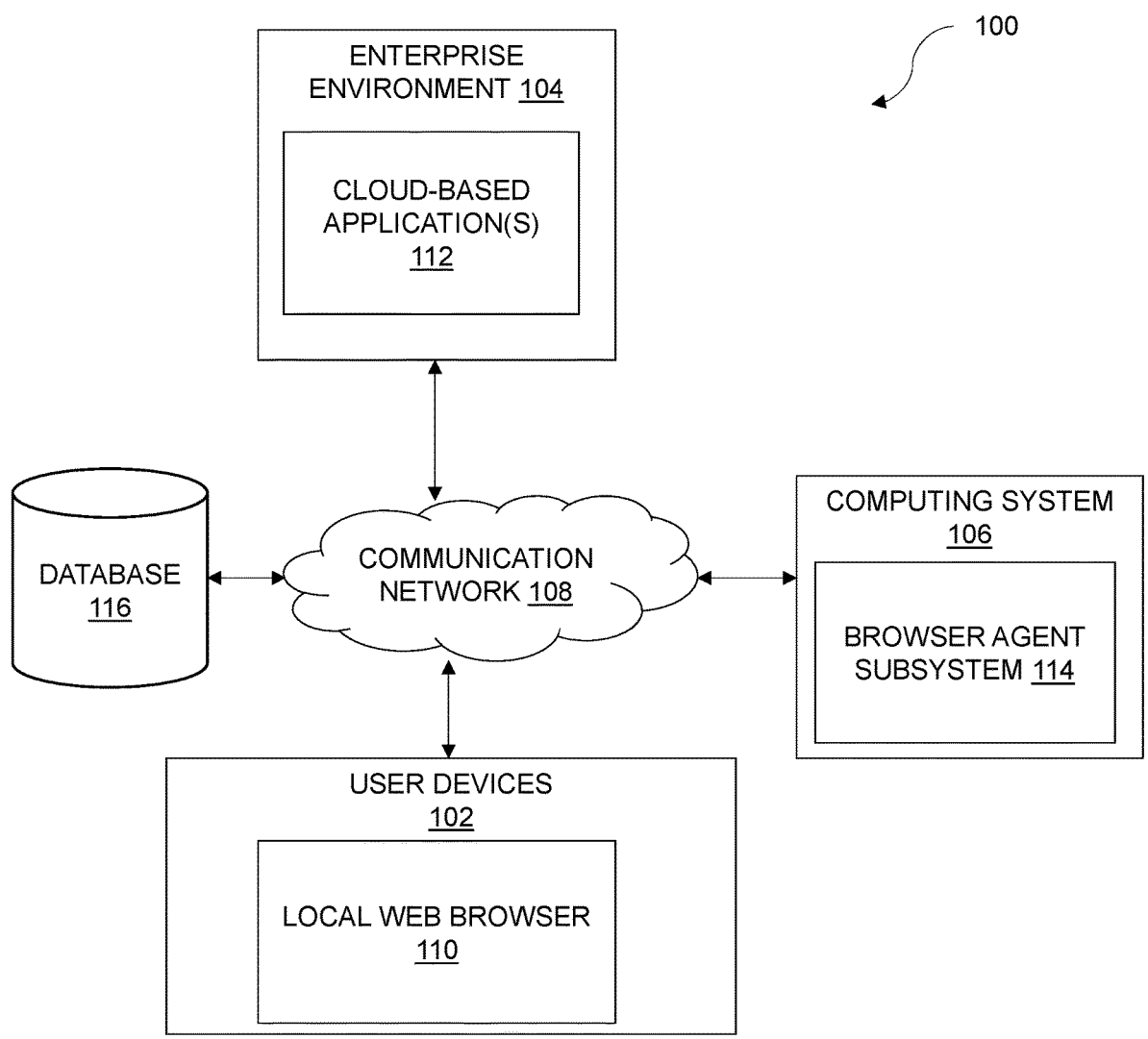
FIG. 1 illustrates an exemplary block diagram representation of a network architecture implementing a system for managing a user access to cloud-based applications in an enterprise environment, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or s "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Throughout this document, the terms 'browser' and 'browser application' may be used interchangeably to mean the same thing. In some respects, the terms 'web application' and 'web app' may be used interchangeably to refer to an application, including metadata, which is installed in a browser application. In some respects, the terms web application and web app may be used interchangeably to refer to a website and/or application to which access is provided over a network (e.g., the Internet) under a specific profile (e.g., a website that provides email service to a user under a specific profile). In some respects, the term application, when used by itself without modifiers, may be used to refer to, but is not limited to, a web application and/or an extension application that is installed or is to be installed in the browser application.

Embodiments of the present disclosure system and a method for managing a user access to cloud-based applications in an enterprise environment to effectively manage identity and access using surrogate email accounts. The present disclosure allows centralized management of cloud-based applications by automating the account management process, including account creation, credential updates, and account deletion. The present disclosure provides full control of the account identity and credentials, which can be applied automatically to user authentication for access control. This enables the enterprise to enforce strict password policies, restrict access to enterprise-issued computers, and allow access only after the users are authenticated by the enterprise identity providers. Further, the present disclosure allows integration of surrogate email accounts with a browser or browser extension to enable the automation of account management and access control without end-user intervention, which can increase productivity, and reduce human errors, data theft, data hacks, data breaches or unauthorized access. The surrogate email accounts are separate from the users' workspace email accounts, which protects user privacy and prevents the need for monitoring of the users' workspace email accounts. Further, the present disclosure is applicable to any email address to be used as a surrogate email address, whether it is at the same or a different domain from the users' workspace email address. Further, the surrogate email accounts are closely monitored and protected, and the emails are used to automate the account management process, including account creation and credential update.

In addition, the stored credentials can be used by a browser or a browser extension to automate user authentication, providing enterprises with the ability to control the users access to the cloud-based applications, based on a location and a device. The security team has the option to control the identity and hide the credential from end users, which can prevent unauthorized access to the clou-based applications from devices that are not authorized by the enterprise. The present disclosure integrates surrogate email accounts with a browser or a browser extension, which streamlines the account management process and enables easy access to cloud-based applications. Any emails that are not related to account management, such as notifications for the cloud-based application website status or application vulnerability, can be sent from the surrogate email account to the users' workspace email account, which ensures that users receive all necessary communications while keeping the surrogate email account protected.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary block diagram representation of a network architecture 100 implementing a system 106 (also referred as computing system 106) for managing a user access to cloud-based applications in an enterprise environment, in accordance with an embodiment of the present disclosure. According to FIG. 1, the network architecture 100 may include one or more user devices 102 associated with a user, an enterprise environment 104 communicatively coupled to the computing system 106 via a communication network 108, and a database 116.

Further, the one or more user devices 102 (individually referred to as the user device 102, and collectively referred to as the user devices 102) may host a local web browser 110. The local web browser 110 may be any web browser known in the art. Further, the computing system 106 may be associated with a browser agent subsystem 114. In an embodiment, the computing system 106 and the browser agent subsystem 114 may be communicatively coupled to the user device 102. In another embodiment, the computing system 106 and the browser agent subsystem 114 may be associated with the computing system 106. Further, the enterprise environment 104 may include a cloud-based application(s) 116.

The local web browser 110 may be a web browser installed on the user device 102 by the user, which may be a preferred browser by the user. The local web browser 110 can be configured to perform the functions of conventional web browsers, including surfing Internet sites, displaying and/or playing multimedia content, received from web servers, and the like. An enterprise can require some or all its users to install and use the local web browser 110 or a browser agent to reduce enterprise security risks associated with the use of cloud-based applications such as a software as a service (SaaS) and Internet applications.

The user devices 102 may be, but is not limited to, a laptop computer, a desktop computer, a tablet computer, a phablet computer, a smartphone, a wearable device, a smartwatch, a personal digital assistant (PDA), a Virtual/Augmented Reality (AR/VR) device, an image capturing device, and the like. Further, the communication network 108 may be a wired communication network and/or a wireless communication network. In one specific embodiment, the communication network 108 may include, but is not limited to, an internet connection, a wireless fidelity (WI-FI), a local area network (LAN), and the like.

Although FIG. 1 illustrates the enterprise environment 104, and the computing system 106 connected to one user device 102 and one local web browser 110, one skilled in the art can envision that the enterprise environment 104, and the computing system 106 can be connected to several user devices and several enterprise environments located at different locations and several local web browsers via the communication network 108.

As an example, the user of the user device 102 may access a web application such as the Cloud-based Application 112 by launching a web browser, such as the local web browser 110, typing into the web browser's address bar a Uniform Resource Locator (URL) address for a web page, whose rendering causes execution of the local web browser 110, and selecting an "enter" key on the user's keyboard. The local web browser 110 may send a Hypertext Transfer Protocol (HTTP) request over the internet to the browser agent subsystem 114 for resources that correspond to the URL.

In response to the HTTP request, the local web browser 110 may receive from the browser agent subsystem 114, a set of resources that the browser agent subsystem 114 identified as relevant for the URL (e.g., HTML for a web page, a CSS document, a JavaScript file, and the like). The local web browser 110 may execute the resources, for example, by rendering a parent HTML file and executing other resources referenced therein. The execution of the resources may cause the local web browser 110 to effectively "display" the local web browser 110 on a display device of the user device 102.

The local web browser 110 may be a normal website that includes extra metadata that is installed as part of the browser application. Installable web apps may use standard web technologies for server-side and client-side code. The local web browser 110 includes one or more web pages. The basic steps involved in displaying a web page on the local web browser 110 include the local web browser 110 requesting a page from the computing system 106. The computing system 106 then determines which web application or web browser is to handle the request, e.g., enterprise or non-enterprise applications and the like. A request is made by the computing system 106 to the determined web application to render the web page. The web application renders the page content and streams it back to the computing system 102, which in turn renders the web page back to the local web browser 110 via the Internet. The rendering of a page involves the execution of code to transform a template specification for the page into browser-readable content (typically HTML, but not restricted to this only). According to an embodiment of the present disclosure, when the local web browser 110 requests a web page, the request is first routed to the browser agent subsystem 114 within the computing system 106. When once the browser agent subsystem 114 receives the web page from the local web browser 110 determines if the web page received contains authentication fields. If yes, then the browser agent subsystem 114 itself determines one or more browsing activities of the user using, hence allowing the users at the user device 102 to access enterprise applications.

The enterprise environment 104 includes a cloud interface, a cloud hardware and operating system (OS), a cloud computing platform, a database, a data center, a on-premises environment, and the like. The cloud interface enables the communication between the cloud computing platform and the user device 102. Also, the cloud interface enables the communication between the cloud computing platform and the local web browser 110. The cloud hardware and an operating system (OS) may include one or more servers on which an operating system is installed and include one or more processing units, one or more storage devices for storing data, and other peripherals required for providing cloud computing functionality. The cloud computing platform is a platform which implements functionalities such as data storage, data analysis, data processing, and data communication on the cloud hardware and the OS via application programming interfaces (APIs) and algorithms and delivers the aforementioned cloud services. The cloud computing platform may include a combination of dedicated hardware and software built on top of the cloud hardware and the OS.

As used herein, "cloud computing environment" "cloud-based applications" or "enterprise environment" refers to a processing environment comprising configurable computing physical and logical assets, for example, networks, servers, storage, applications, services, and the like, and data distributed over the cloud platform. The enterprise environment 104 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing cloud computing functionality.

As used herein, a "surrogate email account" may be an email account created by the enterprise to serve as a temporary or alternative email address for receiving messages, without having to use the primary/workspace email account. This can be useful in situations where a user wants to protect their privacy and/or enterprise needs to implement access control and avoid data breaches related to cloud-based applications. Surrogate authentication, on the other hand, refers to a process where a third-party service or device is used to authenticate a user's identity on behalf of another service or device. The surrogate authentication service acts as an intermediary between the user and the website or application or cloud-based applications, verifying the user's identity on behalf of the website or application.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the enterprise environment 104 as is unique to the present disclosure or necessary for an understanding of the present disclosure is depicted and described. The remainder of the construction and operation of the enterprise environment 104 may conform to any of the various current implementations and practices that were known in the art.

In an exemplary embodiment, the system 106 may be configured to create a surrogate email account corresponding to a user profile associated with one or more cloud-based applications 112 in the enterprise environment 104. The surrogate email account may be distinct from a workspace email account associated with the user profile. The surrogate email account may be created based on a credential strength criteria. The credential strength criteria comprise, but not limited to, a password complexity criteria, a password length criteria, a multi-factor authentication criteria, a regular password change criteria, a password history, and the like. The surrogate email account may be hosted in the same or different domain from the domain associated with the workspace email account. An enterprise service provider and/or a third-party service provider may host the surrogate email account. The one or more cloud-based applications 112 may include but are not limited to, software-as-a-service (SaaS) applications, cloud enabled applications, enterprise-based applications, Internet applications, web applications, and the like.

In an exemplary embodiment, the system 106 may be configured to store, in the database 116, one or more credentials associated with the created surrogate email account. In an exemplary embodiment, the system 106 may be configured to detect a user access to the one or more cloud-based applications 112, through a webpage universal resource locator (URL). In an exemplary embodiment, the system 106 may be configured to retrieve from the database 116, the one or more credentials associated with the surrogate email account, in response to the detected user access.

In an exemplary embodiment, the system 106 may be configured to authenticate dynamically, the user profile to authorize the user access to the one or more cloud-based applications 112, based on the retrieved one or more credentials associated with the surrogate email account.

In an exemplary embodiment, the system 106 may be configured to route one or more first pre-defined emails corresponding to a life cycle of an account management of the user profile, to the surrogate email account. In an exemplary embodiment, the system 106 may be configured to route one or more second pre-defined emails corresponding to at least one of a status of the one or more cloud-based applications 112, an application vulnerability, and update notifications, from the surrogate email account to the workspace email account. In an exemplary embodiment, the system 106 may be configured to route one or more replied emails from the workspace email account to the one or more cloud-based applications 112, through the surrogate email account.

Figure 2:
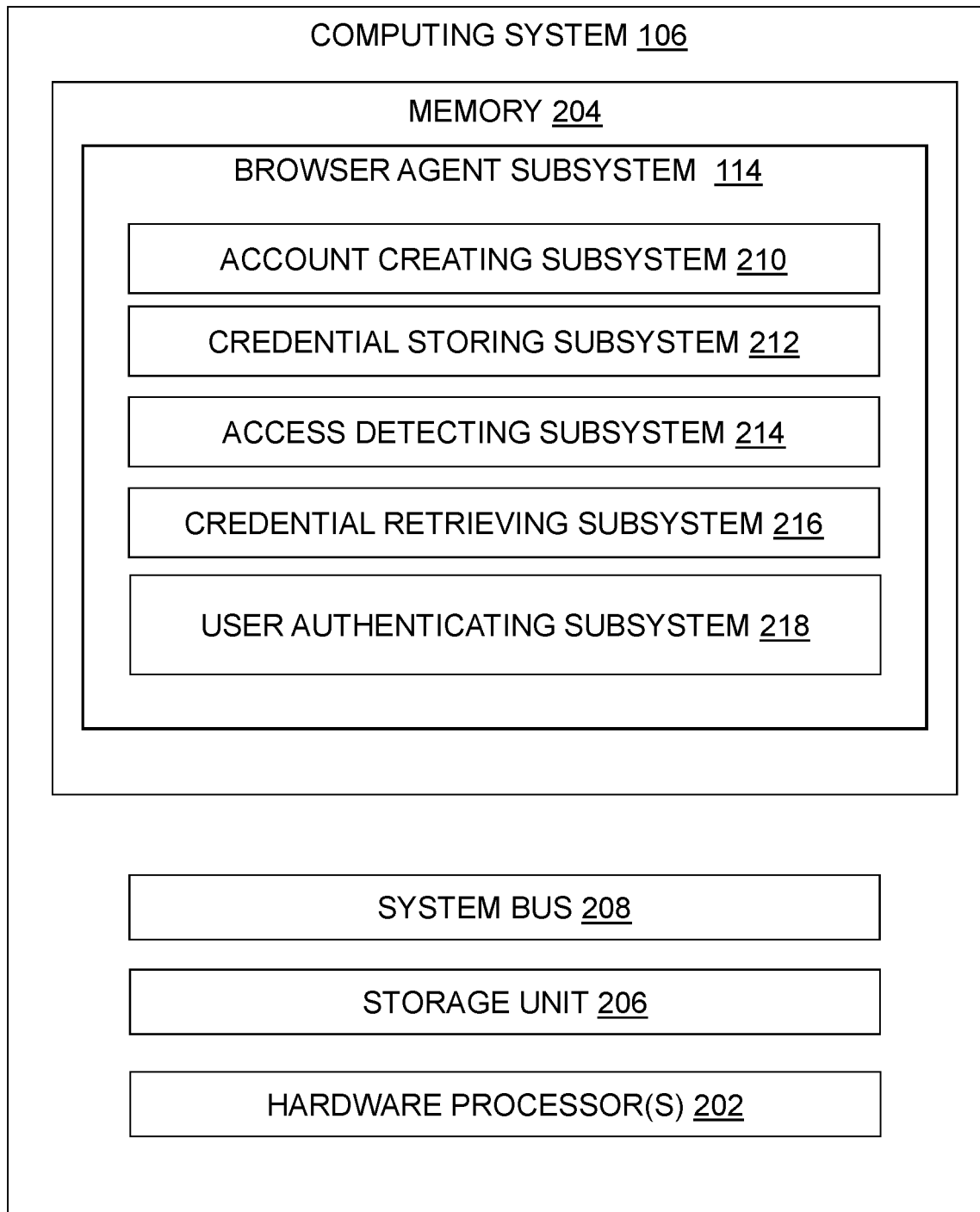
FIG. 2 illustrates an exemplary block diagram representation of a computer-implemented system, such as those shown in FIG. 1, capable of managing a user access to cloud-based applications in an enterprise environment, in accordance with an embodiment of the present disclosure.

FIG. 2 illustrates an exemplary block diagram representation of a computer-implemented system, such as those shown in FIG. 1, capable of managing a user access to cloud-based applications in an enterprise environment, in accordance with an embodiment of the present disclosure. The computing system 106 comprises one or more hardware processors 202, a memory 204, and a storage unit 206. The one or more hardware processors 202, the memory 204, and the storage unit 206 are communicatively coupled through a system bus 208 or any similar mechanism. The memory 204 comprises a plurality of subsystems such as the browser agent subsystem 114 in the form of programmable instructions executable by the one or more hardware processors 202.

Further, the browser agent subsystem 114 includes an account creating subsystem 210, a credential storing subsystem 212, an access detecting subsystem 214, a credential retrieving subsystem 216, and a user authenticating subsystem 218.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application-specific integrated circuits, single-chip computers, and the like.

The memory 204 may be a non-transitory volatile memory and a non-volatile memory. The memory 204 may be coupled to communicate with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 204 includes the browser agent subsystem 114 stored in the form of machine-readable instructions on any of the above-mentioned storage media and may be in communication with and executed by the one or more hardware processors 202.

The storage unit 206 may be a cloud storage or a database. The storage unit 206 may store the one or more credentials, one or more user browsing activities, and the like. The storage unit 206 may also store one or more first pre-defined emails, one or more second pre-defined emails, one or more replied emails, and the like.

In an exemplary embodiment, the account creating subsystem 210 may be configured to create a surrogate email account corresponding to a user profile associated with one or more cloud-based applications 112 in the enterprise environment 104. The surrogate email account may be distinct from a workspace email account associated with the user profile. The surrogate email account may be created based on a credential strength criteria. The credential strength criteria comprise, but not limited to, a password complexity criteria, a password length criteria, a multi-factor authentication criteria, a regular password change criteria, a password history, and the like. The surrogate email account may be hosted in the same or different domain from the domain associated with the workspace email account. An enterprise service provider and/or a third-party service provider may host the surrogate email account. The one or more cloud-based applications 112 may include but are not limited to, software-as-a-service (SaaS) applications, cloud enabled applications, enterprise-based applications, Internet applications, web applications, and the like.

In an exemplary embodiment, the credential storing subsystem 212 may be configured to store, in the database 116, one or more credentials associated with the created surrogate email account. In an exemplary embodiment, the access detecting subsystem 214 may be configured to detect a user access to the one or more cloud-based applications 112, through a webpage universal resource locator (URL). In an exemplary embodiment, the credential retrieving subsystem 216 may be configured to retrieve from the database 116, the one or more credentials associated with the surrogate email account, in response to the detected user access.

In an exemplary embodiment, the user authenticating subsystem 218 may be configured to authenticate dynamically, the user profile to authorize the user access to the one or more cloud-based applications 112, based on the retrieved one or more credentials associated with the surrogate email account. For dynamically authenticating the user profile, the browser agent subsystem 114 may further include a credential masking subsystem (not shown in FIGs.). The credential masking subsystem may be configured to mask the one or more credentials associated with the created surrogate email account. Further, for dynamically authenticating the user profile, the browser agent subsystem 114 may further include an account validating subsystem (not shown in FIGs.). The account validating subsystem may be configured to validate account based on additional authentication factor received on the surrogate email account. Further, the account validating subsystem may be configured to execute dynamically the account validation, based on the additional authentication factor. The additional authentication factor comprises, but is not limited to, a second factor of user authentication sent through at least one of a short message service (SMS), a Time-based One Time Password (TOTP), a single sign on (SSO) service, and the like.

In an exemplary embodiment, an email routing subsystem (not shown in FIGs.) may be configured to route one or more first pre-defined emails corresponding to a life cycle of an account management of the user profile, to the surrogate email account. The life cycle of the account management of the user profile may correspond to, but is not limited to, an account creation, credentials update, and an account deletion corresponding to the one or more cloud-based applications.

In an exemplary embodiment, the email routing subsystem may be configured to route one or more second pre-defined emails corresponding to at least one of a status of the one or more cloud-based applications 112, an application vulnerability, and update notifications, from the surrogate email account to the workspace email account. In an exemplary embodiment, the email routing subsystem may be configured to route one or more replied emails from the workspace email account to the one or more cloud-based applications 112, through the surrogate email account.

In an exemplary embodiment, the browser agent subsystem 114 may further include an access controlling subsystem (not shown in FIGs.). The access controlling subsystem may be configured to control the user access to the one or more cloud-based applications based on an access control criteria. The access control criteria comprise, but is not limited to, account lockout policies, the user access using one or more enterprise-issued computers, a strict password policy, the user access based on authentication by one or more enterprise identity providers, and the like.

Figure 3:
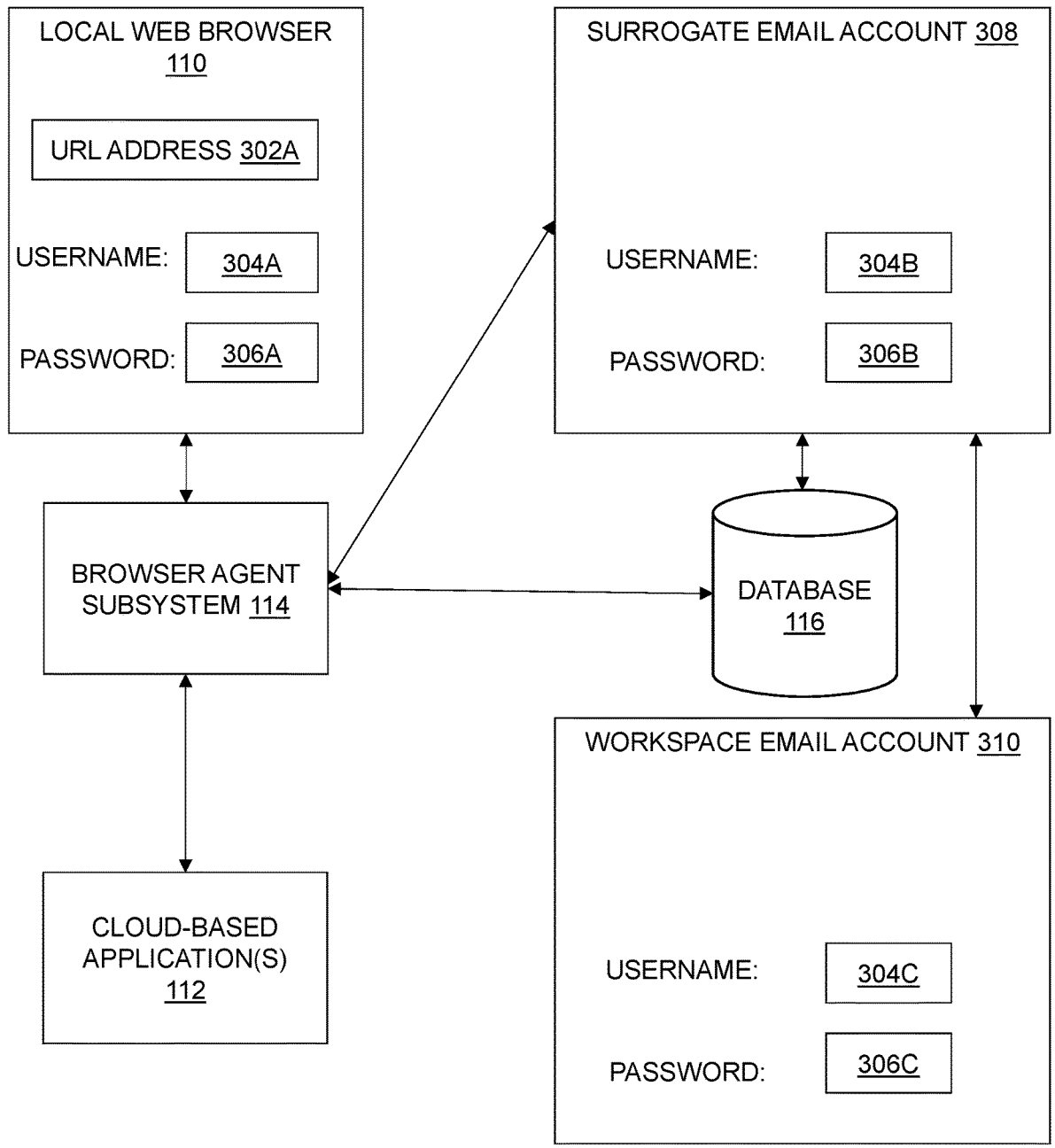
FIG. 3 illustrates an exemplary block diagram representation of an interaction between a user, a cloud-based application, a local browser, and a surrogate email account, according to an example embodiment of the present disclosure.

FIG. 3 illustrates an exemplary block diagram representation of an interaction between a user, a cloud-based application, a local browser, and a surrogate email account, according to an example embodiment of the present disclosure.

A user interface of the local web browser 110 may facilitate the user to input a URL address 302A, a username 304A, and a password 306A. The user interface may be associated with the local web browser 110. In an example, the local web browser 110 may be associated with the browser agent subsystem 114. The browser agent subsystem 114 may correspond to a browser plugin, or browser agent, and the like. In another example, the local web browser 110 may not be associated with the browser agent subsystem 114. In such a scenario, the local web browser 110 may host a surrogate email account 308.

In an example, one or more browser agents may be deployed in the local web browser 110, to monitor users' login activities to one or more enterprise applications. On an endpoint such as the user device 102, the user may be provided with the local web browser 110. Further, the enterprise environment may also include the cloud-based applications 112. The user may access the cloud-based applications 112 through the local web browser 110. The browser agent subsystem 114 may be installed on the local web browser 110. The browser agent subsystem 114 may monitor user browsing activities and facilitating user access to cloud-based applications in an enterprise environment. When the browser agent subsystem 114 detects a login page, and the username 304A is entered in the login form. For example, the login page may include a field to enter the password, which may be detected on the HTML page.

The browser agent subsystem 114 may automatically start or open the surrogate email account 308. The browser agent subsystem 114 may enable auto login to the cloud-based applications 112, based on retrieving one or more credentials related to the surrogate email account 308, from the database 116. The one or more credentials may include a username 304B, and 306B associated with the surrogate email account 308.

The system 106 may use a browser or a browser with a browser extension such as the browser agent subsystem 114 by user to access the cloud-based application 112 such as the SaaS application. In the absence of single sign on (SSO) protocols, conventionally the users are required to create their own account with a password, which allows them to access the SaaS application from any device outside of enterprise control, thereby increasing the risk of data leakage and unauthorized access.

To address this issue, the system 106 may use the surrogate email account 308, which is dedicated to the account management of the SaaS application. The surrogate email account 308 may automate account creation, credential updates, and account deletion, enabling enterprises to manage the credentials of the SaaS application without user intervention. The credential strength is enforced and stored in the database 116.

For example, the browser or browser extension such as the browser agent subsystem 114 detects the login page of the SaaS application and retrieves the stored credential from the database 116 to automatically authenticate the user, allowing enterprises to maintain control over the identity and credentials of any SaaS applications without disclosing the password to users.

The surrogate email account 308 processes all emails related to account management and works with the local web browser 110 to automate user authentication. Non-account management emails, such as but not limited to, website status updates or vulnerability notifications, are forwarded from the surrogate email account 308 to the workspace email account 310 on behalf of the cloud-based applications 112 such as the SaaS application. The surrogate email account 308 can also forward replied emails to the cloud-based applications 112 such as the SaaS application on behalf of the workspace email account 310, effectively acting as a mail proxy for these non-account management emails.

Figure 4:
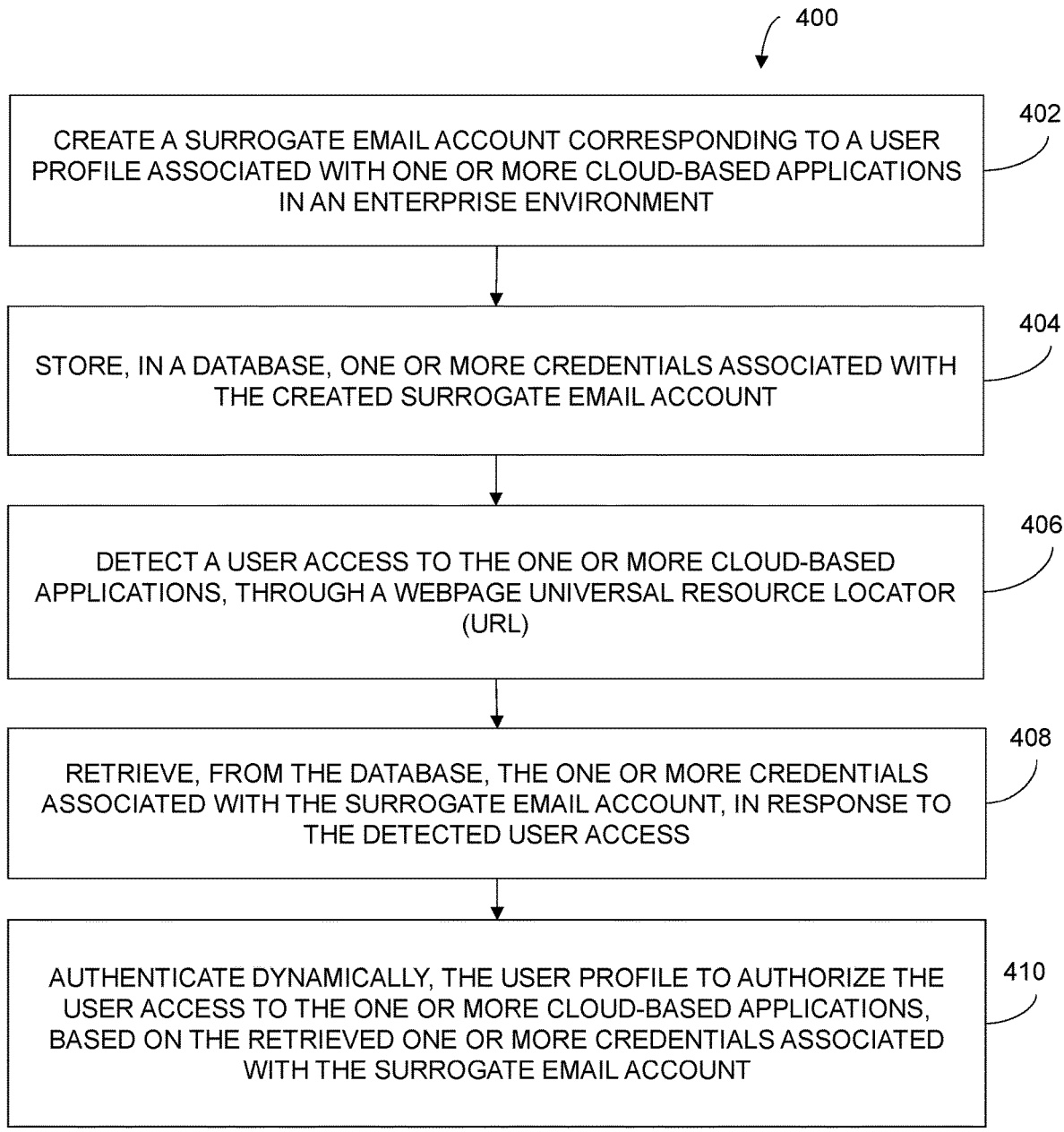
FIG. 4 illustrates a flow chart depicting a method for managing a user access to cloud-based applications in an enterprise environment, according to an example embodiment of the present disclosure.

FIG. 4 illustrates a flow chart depicting a method 400 for managing a user access to cloud-based applications in an enterprise environment, according to an example embodiment of the present disclosure.

At block 402, the method 400 includes creating, by one or more hardware processors 202 associated with a computer-implemented system 106, a surrogate email account corresponding to a user profile associated with the one or more cloud-based applications 112 in the enterprise environment 104. The surrogate email account is distinct from the workspace email account associated with the user profile.

At block 404, the method 400 includes storing, by the one or more hardware processors 202, in the database 116, one or more credentials associated with the created surrogate email account.

At block 406, the method 400 includes detecting, by the one or more hardware processors 202, a user access to the one or more cloud-based applications 112, through a webpage universal resource locator (URL).

At block 408, the method 400 includes retrieving, by the one or more hardware processors 202, from the database 116, the one or more credentials associated with the surrogate email account, in response to the detected user access.

At block 410, the method 400 includes authenticating dynamically, by the one or more hardware processors 202, the user profile to authorize the user access to the one or more cloud-based applications, based on the retrieved one or more credentials associated with the surrogate email account.

The method 400 may be implemented in any suitable hardware, software, firmware, or combination thereof. The order in which the method 400 is described is not intended to be construed as a limitation, and any number of the described method blocks may be combined or otherwise performed in any order to implement the method 400 or an alternate method. Additionally, individual blocks may be deleted from the method 400 without departing from the spirit and scope of the present disclosure described herein. Furthermore, the method 400 may be implemented in any suitable hardware, software, firmware, or a combination thereof, that exists in the related art or that is later developed. The method 400 describes, without limitation, the implementation of the system 106. A person of skill in the art will understand that method 400 may be modified appropriately for implementation in various manners without departing from the scope and spirit of the disclosure.

Figure 5:
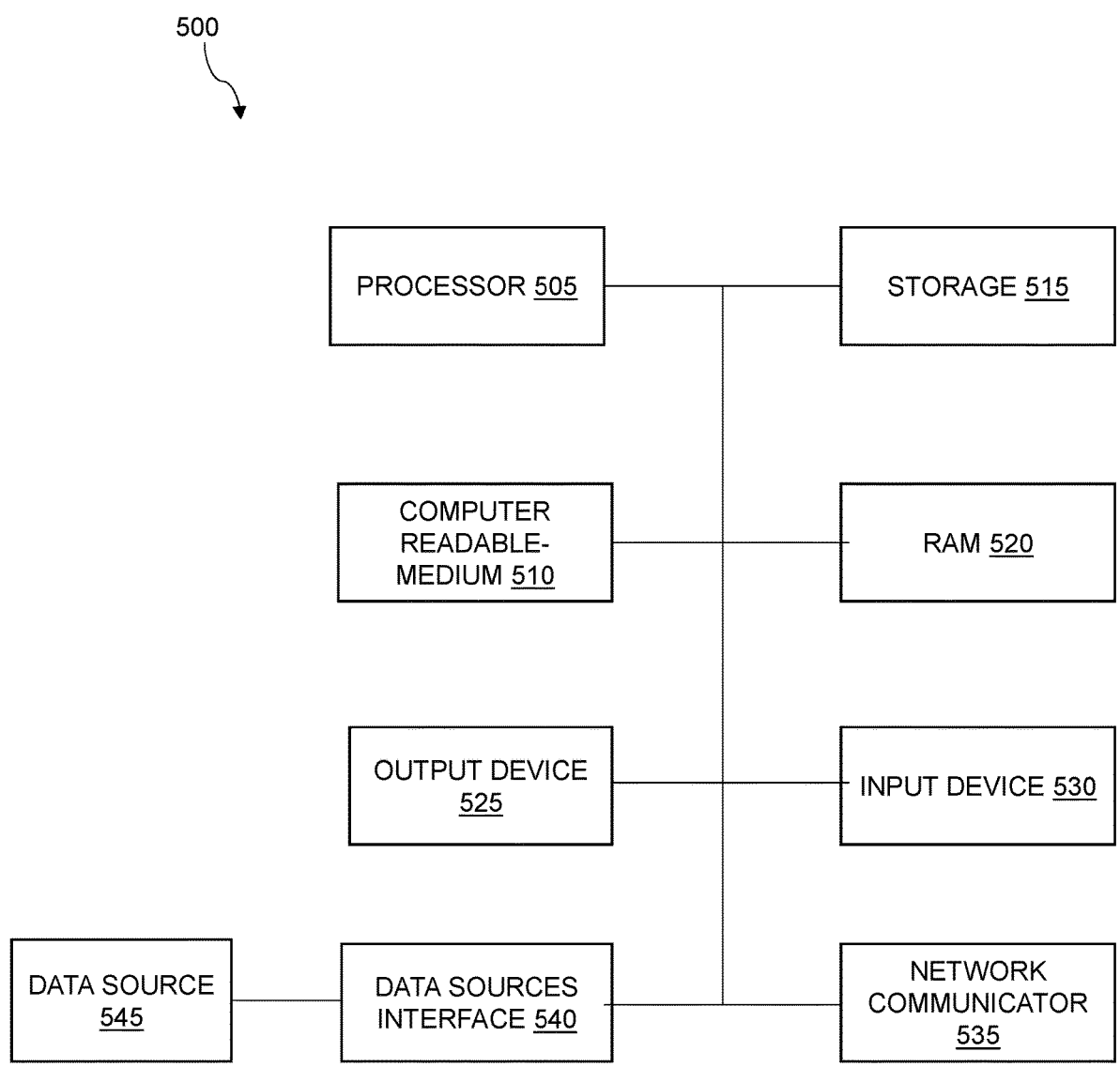
FIG. 5 illustrates an exemplary block diagram representation of a hardware platform for an implementation of the disclosed system, according to an example embodiment of the present disclosure.

FIG. 5 illustrates an exemplary block diagram representation of a hardware platform 500 for implementation of the disclosed system 106, according to an example embodiment of the present disclosure. For the sake of brevity, the construction, and operational features of the system 106 which are explained in detail above are not explained in detail herein. Particularly, computing machines such as but not limited to internal/external server clusters, quantum computers, desktops, laptops, smartphones, tablets, and wearables which may be used to execute the system 106 or may include the structure of the hardware platform 500. As illustrated, the hardware platform 500 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 500 may be a computer system such as the system 106 that may be used with the embodiments described herein. The computer system may represent a computational platform that includes components that may be in a server or another computer system. The computer system may execute, by the processor 505 (e.g., single or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and analyze the data. For example, the browser agent subsystem 114 includes the account creating subsystem 210, the credential storing subsystem 212, the access detecting subsystem 214, the credential retrieving subsystem 216, and the user authenticating subsystem 218.

The instructions on the computer-readable storage medium 510 are read and stored the instructions in storage 515 or random-access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interacting with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bot responses by the executable chatbot.

A network communicator 535 may be provided to connect the computer system to a network and in turn to other devices connected to the network including other clients, servers, data stores, and interfaces, for example. A network communicator 535 may include, for example, a network adapter such as a LAN adapter or a wireless adapter. The computer system may include a data source(s) interface 540 to access the data source 545. The data source 545 may be an information resource. As an example, a database of exceptions and rules may be provided as the data source 545. Moreover, knowledge repositories and curated data may be other examples of the data source 545.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

We claim:

1. A computer-implemented system for managing a user access to cloud-based applications in an enterprise environment, the computer-implemented system comprising:
   one or more hardware processors; and
   a memory coupled to the one or more hardware processors, wherein the memory comprises a browser agent subsystem in form of programmable instructions executable by the one or more hardware processors, wherein the browser agent subsystem comprises:
      an account creating subsystem configured to automatically create a surrogate email account corresponding to a user profile associated with one or more cloud-based applications in an enterprise environment, wherein the surrogate email account is distinct from a workspace email account associated with the user profile, wherein the surrogate email account is created based on a credential strength criteria, wherein the credential strength criteria comprise at least one of: a password complexity criteria, a password length criteria, a multi-factor authentication criteria, a regular password change criteria, and a password history;
      a credential storing subsystem configured to store, in a database, one or more credentials associated with the created surrogate email account;
      an access detecting subsystem configured to monitor browser activity and detect a user access to the one or more cloud-based applications, through a webpage universal resource locator (URL) associated with a login interface;
      a credential retrieving subsystem configured to retrieve, from the database, the one or more credentials associated with the surrogate email account, in response to the detected user access; and
      a user authenticating subsystem configured to authenticate dynamically, the user profile to authorize the user access to the one or more cloud-based applications, based on the retrieved one or more credentials associated with the surrogate email account, wherein for dynamically authenticating the user profile, the browser agent subsystem comprises:
      a credential masking subsystem configured to mask the one or more credentials associated with the created surrogate email account.

2. The computer-implemented system of claim 1, wherein the browser agent subsystem further comprises:
   an email routing subsystem configured to:
      route one or more first pre-defined emails corresponding to a life cycle of an account management of the user profile, to the surrogate email account;
      route one or more second pre-defined emails corresponding to at least one of a status of the one or more cloud-based applications, an application vulnerability, and update notifications, from the surrogate email account to the workspace email account; and
      route one or more replied emails from the workspace email account to the one or more cloud-based applications, through the surrogate email account.

3. The computer-implemented system of claim 2, wherein the life cycle of the account management of the user profile corresponds to at least one of an account creation, credentials update, and an account deletion corresponding to the one or more cloud-based applications.

4. The computer-implemented system of claim 1, wherein the browser agent subsystem further comprises:
   an access controlling subsystem configured to control the user access to the one or more cloud-based applications based on an access control criteria.

5. The computer-implemented system of claim 4, wherein the access control criteria comprises at least one of: account lockout policies, the user access using one or more enterprise-issued computers, a password policy, and the user access based on authentication by one or more enterprise identity providers.

6. The computer-implemented system of claim 1, wherein for dynamically authenticating the user profile, the browser agent subsystem further comprises:
   an account validating subsystem configured to:
      validate account based on additional authentication factor received on the surrogate email account; and
      execute dynamically the account validation, based on the additional authentication factor.

7. The computer-implemented system of claim 6, wherein the additional authentication factor comprises at least one of: a second factor of user authentication sent through at least one of a short message service (SMS), a Time-based One Time Password (TOTP), and a single sign on (SSO) service.

8. A computer-implemented method for managing a user access to cloud-based applications in an enterprise environment, the computer-implemented method comprising:
   creating automatically, by one or more hardware processors associated with a computer-implemented system, a surrogate email account corresponding to a user profile associated with one or more cloud-based applications in an enterprise environment, wherein the surrogate email account is distinct from a workspace email account associated with the user profile, wherein the surrogate email account is created based on a credential strength criteria, and wherein the credential strength criteria comprise at least one of: a password complexity criteria, a password length criteria, a multi-factor authentication criteria, a regular password change criteria, and a password history;
   storing, by the one or more hardware processors, in a database, one or more credentials associated with the created surrogate email account;
   monitoring, by the one or more hardware processors, browser activity and detecting a user access to the one or more cloud-based applications, through a webpage universal resource locator (URL) associated with a login interface;
   retrieving, by the one or more hardware processors, from the database, the one or more credentials associated with the surrogate email account, in response to the detected user access; and
   authenticating dynamically, by the one or more hardware processors, the user profile to authorize the user access to the one or more cloud-based applications, based on the retrieved one or more credentials associated with the surrogate email account, wherein to authenticate dynamically the user profile;

mask, by the one or more hardware processors, the one or more credentials associated with the created surrogate email account.

9. The computer-implemented method of claim 8 further comprising:
routing, by the one or more hardware processors, one or more first pre-defined emails corresponding to a life cycle of an account management of the user profile, to the surrogate email account;
routing, by the one or more hardware processors, one or more second pre-defined emails corresponding to at least one of a status of the one or more cloud-based applications, an application vulnerability, and update notifications, from the surrogate email account to the workspace email account; and
routing by the one or more hardware processors, one or more replied emails from the workspace email account to the one or more cloud-based applications, through the surrogate email account.

10. The computer-implemented method of claim 9, wherein the life cycle of the account management of the user profile corresponds to at least one of an account creation, credentials update, and an account deletion corresponding to the one or more cloud-based applications.

11. The computer-implemented method of claim 8 further comprising:
controlling, by the one or more hardware processors, the user access to the one or more cloud-based applications based on an access control criteria.

12. The computer-implemented method of claim 11, wherein the access control criteria comprise at least one of: account lockout policies, the user access using one or more enterprise-issued computers, a password policy, and the user access based on authentication by one or more enterprise identity providers.

13. The computer-implemented method of claim 8, wherein dynamically authenticating the user profile further comprises:
validating by the one or more hardware processors, account based on additional authentication factor received on the surrogate email account; and
executing dynamically, by the one or more hardware processors, the account validation, based on the additional authentication factor.

14. The computer-implemented method of claim 13, wherein the additional authentication factor comprises at least one of: a second factor of user authentication sent through at least one of a short message service (SMS), a Time-based One Time Password (TOTP), and a single sign on (SSO) service.

15. A non-transitory computer-readable storage medium having programmable instructions stored therein, that when executed by one or more hardware processors, cause the one or more hardware processors to:
create automatically a surrogate email account corresponding to a user profile associated with one or more cloud-based applications in an enterprise environment, wherein the surrogate email account is distinct from a workspace email account associated with the user profile;
store, in a database, one or more credentials associated with the created surrogate email account;
monitor browser activity and detect a user access to the one or more cloud-based applications, through a webpage universal resource locator (URL) associated with a login interface;
retrieve, from the database, the one or more credentials associated with the surrogate email account, in response to the detected user access; and
authenticate dynamically, the user profile to authorize the user access to the one or more cloud-based applications, based on the retrieved one or more credentials associated with the surrogate email account, wherein to dynamically authenticate the user profile, the one or more credentials associated with the created surrogate email account are masked.

* * * * *